United States Patent [19]

Chum et al.

[11] Patent Number: 5,089,321

[45] Date of Patent: Feb. 18, 1992

[54] MULTILAYER POLYOLEFINIC FILM STRUCTURES HAVING IMPROVED HEAT SEAL CHARACTERISTICS

[75] Inventors: Pak-Wing S. Chum; Kaelyn C. Koch, both of Lake Jackson, Tex.

[73] Assignee: The Dow Chemical Company, Midland, Mich.

[21] Appl. No.: 639,648

[22] Filed: Jan. 10, 1991

[51] Int. Cl.$^5$ .................... B32B 27/08; B32B 7/02
[52] U.S. Cl. .................. 428/218; 428/349; 428/516; 428/518; 428/476.1; 428/910; 206/532; 156/244.17
[58] Field of Search ........... 428/349, 516, 518, 910, 428/218

[56] References Cited

U.S. PATENT DOCUMENTS

| | | |
|---|---|---|
| 4,064,296 | 12/1977 | Bornstein et al. . |
| 4,352,849 | 10/1982 | Mueller . |
| 4,640,856 | 2/1987 | Ferguson et al. . |
| 4,668,752 | 5/1987 | Tominari et al. . |
| 4,724,185 | 2/1988 | Shah . |
| 4,755,419 | 7/1988 | Shah . |
| 4,798,801 | 1/1989 | Hazlitt et al. . |
| 4,820,557 | 4/1989 | Warren ................ 428/520 |
| 4,927,708 | 5/1990 | Herran et al. . |
| 4,963,419 | 10/1990 | Lustig et al. ............. 428/520 |

*Primary Examiner*—P. C. Sluby

[57] ABSTRACT

Multilayer thermoplastic film structures comprising at least one heat-sealable outer layer (A) and at least one core layer (B) are disclosed. Layer (A) has improved heat sealability after irradiation (e.g. electron beam). Layer (B) has improved shrinkage after irradiation. Layer (A) is a linear polyethylene having a melt index from about 2 to about 20 g/10 minutes, a density from about 0.88 to about 0.92 g/cc, a molecular weight distribution ($I_{10}/I_2$) from about 5 to about 8, a fraction of the polyethylene having a degree of branching less than or equal to 2 methyls/1000 carbons of not more than 15% by weight and a fraction of the polyethylene having a degree of branching greater than or equal to 25 methyls/1000 carbons of not more than 25% by weight of the polymer. Layer (B) is a linear polyethylene having a melt index from about 0.05 to about 5 g/10 minutes, a density from about 0.88 to about 0.94 g/cc and a molecular weight distribution ($I_{10}/I_2$) from about 8 to about 30.

23 Claims, 7 Drawing Sheets

MULTILAYER POLYOLEFINIC FILM STRUCTURES HAVING IMPROVED HEAT SEAL CHARACTERISTICS

FIELD OF THE INVENTION

This invention relates to oriented multilayer, heat sealable thermoplastic film structures. More particularly, the invention relates to multilayer film structures which retain heat sealability even after irradiation.

BACKGROUND OF THE INVENTION

Many polymers have been developed which can withstand exposure to irradiation, often incorporating specific additives or antioxidants which prevent polymer degradation. Films and multilayer films made from these and other polymers are sometimes exposed to irradiation during processing or use. For example, irradiation is used in some instances to destroy microorganisms in the wrapped product (e.g., in food sterilization) and to also prepare at least one component of the film for thermal shrinkage at a later time.

Multilayer film packaging has many requirements for both enduring the irradiation exposure and preparing part of the structure for subsequent shrinkage. Typically, the package is a multilayer structure, with the different layers performing different functions. Usually the layers are made from thermoplastic polymers. For example, one layer may be a barrier layer (e.g., ethylene vinyl alcohol (EVOH)), the heat seal layer may be a polyethylene (e.g., linear low density polyethylene (LLDPE)), while still another type of polyethylene (e.g., high density polyethylene (HDPE)) might be used as the structural or core layer.

Irradiation of multilayer film structures can be done by exposure to Cobalt 60 (gamma irradiation) or by electron beam (beta). When the entire multilayer film structure is irradiated, the heat sealability of the heat seal layer often decreases (i.e., the intiation temperature of the heat sealing increases), especially when the heat seal layer is polyethylene, while the physical properties (e.g., strength) of the structural layer increase. Reduction in heat sealability causes lower heat seal strengths and narrower heat sealing temperature ranges. Exposure to irradiation, especially beta irradiation, and subsequent exposure to heat can also cause the core layer and the heat seal layer to shrink, especially when the multilayer structure has been oriented (e.g., film). Controlled shrinkage of the core layer is desirable, but a narrower heat sealing temperature range of the heat seal layer is not desirable.

Irradiation of the heat seal layer also results in higher heat seal initiation temperatures as well as narrower heat seal temperature ranges. The narrow heat seal range of the heat seal layer can cause the wrapped product to become exposed to the external environment and contamination, thus negating the sterilizing effects of irradiation. A better balance of heat seal and shrinkage properties of the overall structure is needed before and after irradiation so that the overall integrity of the package is not lost after irradiation.

SUMMARY OF THE INVENTION

A multilayer heat-sealable thermoplastic film structure has now been discovered that has improved heat seal performance after irradiation. The novel multilayer film structure comprises at least one heat sealable outer layer (A) and at least one core layer (B).

Layer (A) of the multilayer thermoplastic film structure comprises a first linear polyethylene having:
 (a) a density from about 0.88 grams/cubic centimeter (g/cc) to about 0.92 g/cc,
 (b) a melt index, measured as $I_2$, from about 2 grams/10 minutes to about 20 grams/10 minutes,
 (c) a molecular weight distribution, measured as $I_{10}/I_2$, from about 5 to about 8, and wherein
 (d) 15 percent by weight or less of said linear polyethylene has a degree of branching less than or equal to 2 methyls/1000 carbons, and
 (e) 25 percent by weight or less of said linear polyethylene has a degree of branching equal to or greater than 25 methyls/1000 carbons.

Layer (B) comprises a second linear polyethylene having:
 (a) a density from about 0.88 g/cc to about 0.94 g/cc,
 (b) a melt index, measured as $I_2$, from about 0.05 grams/10 minutes to about 5 gram/10 minutes,
 (c) a molecular weight distribution, measured as $I_{10}/I_2$, from about 8 to about 30.

DETAILED DESCRIPTION OF THE INVENTION

Figure 7:
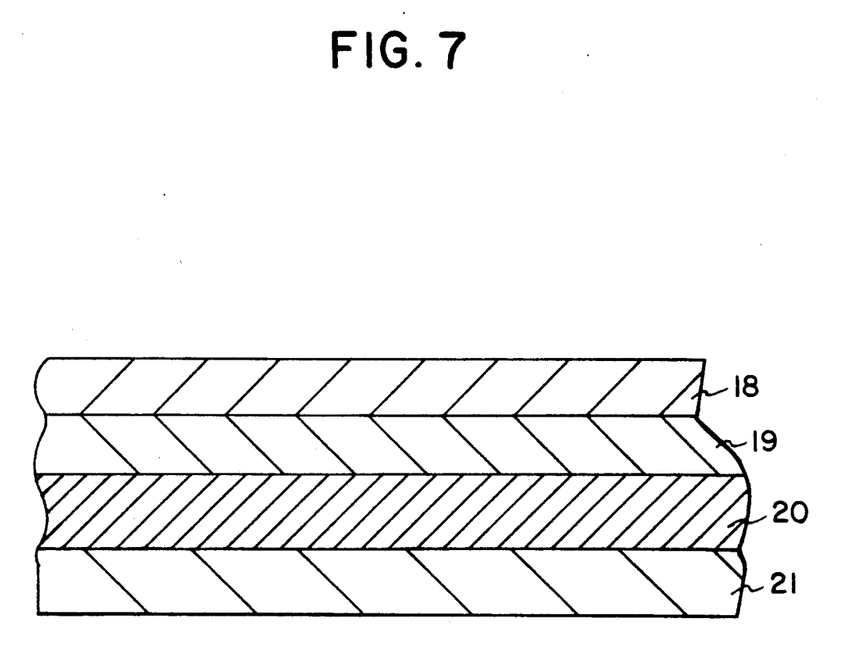
FIG. 7 depicts one multilayer film structure of the present invention.

The multilayer structures of the present invention comprise at least one heat-sealable outer layer and at least one core layer. The multilayer structure can have many layers, but the heat-sealable layer of the present invention must be on at least one outer surface of the structure to take advantage of the improvement in heat seal characteristics. Typical multilayer structures can be made using a coextruded blown or cast film process. FIG. 7 shows a multilayer structure of the present invention. The structures of the film product can generally be described as an A/B/D/X multilayer structure wherein layer A (18) is the heat sealable outer layer, layer B (19) is the core layer and layers D (20) and/or X (21) are a tie layer(s) and/or a barrier layer(s). The core layer (19) can be adjacent to the heat seal layer, but does not have to be. The multilayer film structure is comprised of from 2 to about 20 layers, preferably from 2 to about 7 layers.

The multilayer film structure can be irradiated at any point during the process. For example, the heat-sealable outer layer and the core layer of the present invention can be coextruded, irradiated and subsequently laminated and oriented (i.e., stretched) to make the final multilayer film structure, so long as the heat-sealable outer layer is on at least one outer surface of the structure. Conversely, the entire multilayer structure can be formed and oriented, and then subsequently irradiated. The order of the steps of orientation and irradiation is not critical. Irradiation is preferably accomplished by using an electron beam (beta) irradiation device at a dosage level of from about 0.5 megarad (Mrad) to about 20 Mrad.

Thickness of the multilayer film structures can vary from about 0.1 mil to about 50 mils, preferably from about 0.5 mils to about 10 mils. The tie layer(s) and/or the barrier layer(s) are made from conventional thermoplastic polymers known to be useful for this purpose, especially polyolefinic polymers.

Thermoplastic polymers useful as the tie layer(s) include ethylene acrylic acid interpolymers (e.g., U.S. Pat. No. 4,599,392), ethylene methacrylic acid interpolymers (e.g., U.S. Pat. Nos. 4,248,990 and 4,252,924), succinic acid or succinic anhydride grafted polyolefins and blends with ungrafted polyolefins (e.g., U.S. Pat. Nos. 4,684,576, 4,741,970 and 4,394,485), vinyl acetate interpolymers, and the like. All of the afore-mentioned U.S. Patents are incorporated herein by reference. Thermoplastic polymers useful for the barrier layer(s) include EVOH, polyvinyl chloride, polyvinylidene chloride, nylon, and the like.

The heat-sealable outer layer and the core layer of the present invention are fabricated from linear polyethylene. Manufacture of linear polyethylene is disclosed, e.g., in U.S. Pat. No. 4,076,698, incorporated herein by reference, and involves coordination catalysts of the "Ziegler" type or "Phillips" type and includes variations of the Ziegler type, such as the Natta type. These catalysts may be used at very high pressures, but may also (and generally are) used at very low or intermediate pressures. The products made by these coordination catalysts are generally known as "linear" polymers because of the substantial absence of branched chains of polymerized monomer units pendant from the main polymer "backbone." It is these linear polymers to which the present invention pertains. Linear low density polyethylene (LLDPE) and ultra low density polyethylene (ULDPE) typically have a density between about 0.88 grams/cubic centimeter (g/cc) and about 0.94 g/cc. The density of the polyethylene is lowered by copolymerizing ethylene with minor amounts of an alpha, beta-ethylenically unsaturated alkene(s) having from 3 to 20 carbons per alkene molecule (e.g., 1-propene, 1-butene, 1-pentene, 4-methyl-1-pentene, 1-hexene, 1-octene, 1,9-decadiene and 1,7-octadiene), preferably 4 to 8 carbon atoms (e.g., 1-butene, 1-hexene and 1-octene) and most preferably 8 carbons per alkene molecule (i.e., 1-octene). The amount of the alkene comonomer is generally sufficient to cause the density of the linear low density polymer to be substantially in the same density range as LDPE, due to the alkyl side chains on the polymer molecule, yet the polymer remains in the "linear" classification; they are conveniently referred to as "linear low density polyethylene." These polymers retain much of the strength, crystallinity, and toughness normally found in HDPE homopolymers of ethylene, but the higher alkene comonomers impart high "cling" and "block" characteristics to extrusion or cast films and the high "slip" characteristic inherently found in HDPE is diminished.

The use of coordination-type catalysts for copolymerizing ethylene with higher alkenes to make LLDPE and ULDPE copolymers having densities between about 0.88 g/cc and about 0.94 g/cc is disclosed variously in, e.g., U.S. Pat. Nos. 2,699,457; 2,846,425; 2,862,917; 2,905,645; 3,058,963; 4,076,698; and 4,668,752, incorporated herein by reference. The density of the linear polyethylene useful in the heat sealable outer layer (A) in the present invention is from about 0.88 g/cc to about 0.92 g/cc, preferably from about 0.89 g/cc to about 0.915 g/cc. The density of the linear polyethylene useful in the core layer (B) in the present invention is from about 0.88 g/cc to about 0.94 g/cc, preferably from about 0.9 g/cc to about 0.93 g/cc.

The molecular weight of the LLDPE useful in the present invention is indicated and measured by melt index according to ASTM D-1238, Condition (E) (i.e., 190° C./2.16 kilograms): also known as $I_2$. The $I_2$ of the linear polyethylene used in the heat sealable outer layer (A) can be as low as about 0.5 grams/10 minutes, but is preferably from about 2 grams/10 minutes (g/10 minutes) to about 20 g/10 minutes, more preferably from about 3 g/10 minutes to about 10 g/10 minutes. The $I_2$ of the linear polyethylene used in the core layer (B) can be from about 0.05 g/10 minutes to about 5 g/10 minutes, preferably from about 0.2 g/10 minutes to about 1 g/10 minutes.

The molecular weight distribution is indicated and measured by $I_{10}/I_{hd\,2}$ according to ASTM D-1238, Conditions (N) (190° C./10 kilograms) and (E), respectively. The $I_{10}/I_2$ of the heat sealable outer layer (A) can be from about 5 to about 8, preferably from about 6.5 to about 8. The $I_{10}/I_2$ of the core layer (B) can be from about 8 to about 30, preferably from about 8 to about 15. Molecular weight distribution can be achieved by varying catalytic conditions, reactor conditions or feed percentages. Blends of polyethylenes can also be used. Such blends can be prepared by blending separate and discrete polyethylene polymers, or polymerizing the polyethylene polymer in-situ in multiple reactors, (e.g. the technique disclosed in U.S. Pat. No. 3,914,342, incorporated herein by reference). It is important that the linear polyethylene(s) be well mixed when using discrete polymer blends.

Additives, (e.g., anti-oxidants, pigments, hydrophobic and/or hydrophilic agents, etc.), may be incorporated into the linear polyethylene to the extent that they do not interefere with the heat sealability of the outer layer and the shrinkability of the core layer after orientation and exposure to irradiation.

Short chain branching distribution (SCBD) of the polymer fractions of the polyethylene polymers useful in the heat seal layer and the core layer is measured according to the temperature rising elution fractionation (abbreviated herein as "TREF") technique described herein and in U.S. Pat. No. 4,798,081, incorporated herein by reference.

Experimental Procedure for Determining Short Chain Branching Distribution

I. TREF Device Design

Figure 1:
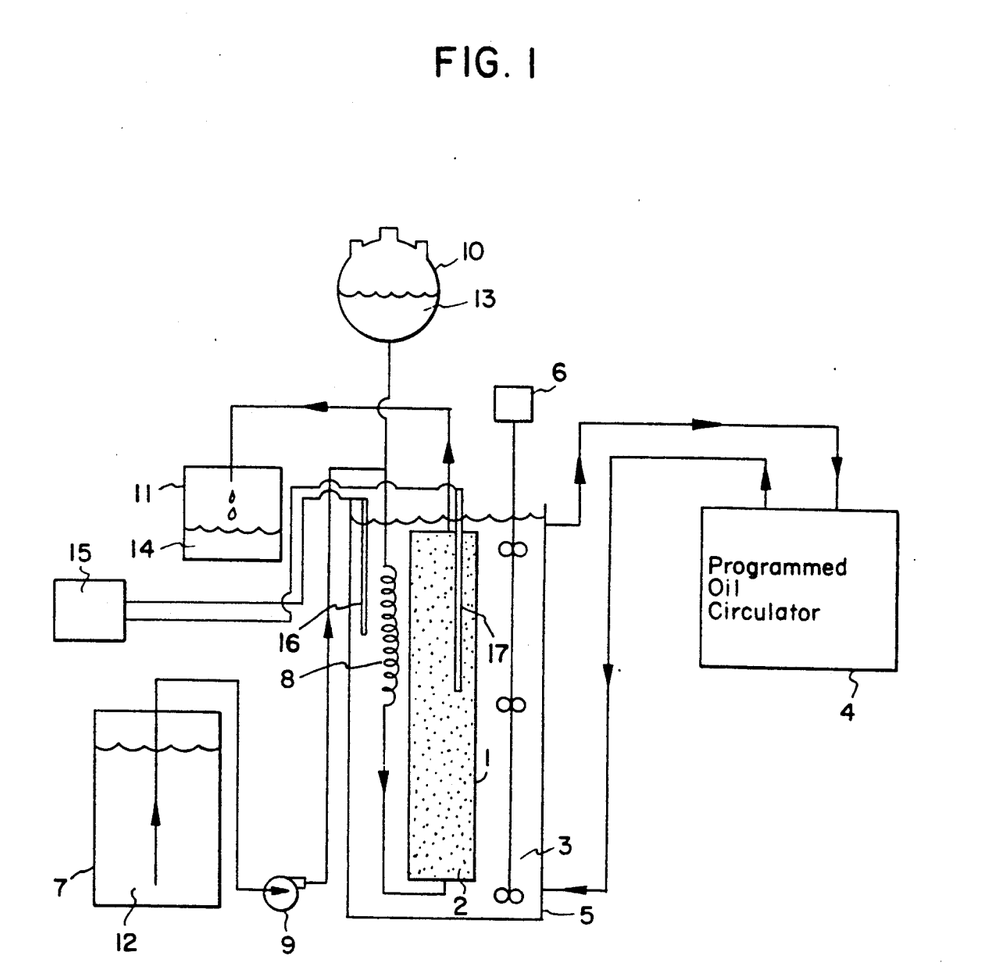
FIG. 1 shows the preparative scale temperature rising elution fractionation apparatus used to determine the branching distribution in the polymer fractions.

A diagram of the TREF apparatus is shown in FIG. 1. The column (1) is 4 inches in diameter and 29 inches in length, a size easily capable of fractionating up to 20 grams of sample. The column is packed with stainless steel shot (2) and heated by a circulating oil bath (3). The entire apparatus is enclosed within a hood (not shown) to contain any solvent or heating oil vapors.

A. Column Construction

The column is constructed of 4 inch schedule 40 steel pipe. Legs of one inch angle iron were welded on the pipe to keep it in a vertical position. The end caps are welded on the pipe to prevent any solvent leakage into the oil system. A one inch hole is left in each end to allow for packing of the column and to accomodate a 1 inch MPT $\times \frac{1}{4}$ inch tubing connection.

B. Column Packing

The column is tightly packed with 0.028 inch diameter stainless steel shot. The interstitial volume of the column is approximately 1700 milliliters. Stainless steel shot effectively prevents channeling and provides good heat transfer through the column.

C. Heating System

The column temperature is regulated by a Haake N3B circulating bath controlled by a Haake PG-20 temperature programmer (4). The oil used is Primol 355 mineral oil or a light silicon oil. The 10 gallon insulated bath (5) containing the column is galvanized steel. The oil circulator injects oil at the bottom of this bath with the return from the top. An air driven motor (6) is used for agitation of the large oil bath.

D. Solvent System

The solvent used is 1, 2, 4-trichlorobenzene (TCB) (12). It is pumped from a reservoir (7) into the bottom of the column through a preheating coil (8) located in the large bath. The solvent is pumped at a flow rate of approximately 40 ml/minute using a Fluid Metering, Inc. lab pump (9) designated RP-G-150 with a 2-SSY ($\frac{3}{8}$ inch) stainless steel pump head module. This pump allows control of flow rates from 1 to 100 milliliters/minute.

E. Column Loading System

Polymer samples (13) are loaded on the column utilizing a gravity flow method. The sample is first dissolved in 1700 ml of TCB in a heated 5 liter flask (10). The 130° C. column is then loaded with the solution, also at 130° C. One hundred milliliters of clean solvent is then heated and added to flush all transfer lines. These lines are heated with rheostat controlled heat tape (not shown).

F. Fraction Collection

The column eluent (14) is collected in one gallon metal cans (11). Acetone is then added to the cans to precipitate the polymer. Fraction work-up will be discussed in a later section.

II. Fractionation Procedure and Column Operation

A. Loading the Column

The polymer sample (about 20 grams) is dissolved in 1700 ml of TCB in a heated 5 liter flask. Approximately 3 to 4 hours is required to carry out this step. The column, the flask, and all transfer lines must be above 120° C. to insure that no polymer is precipitated during the loading step. After the polymer solution is deposited on the column, a wash of fresh solvent is used to eliminate all polymer from the transfer lines. The amount of wash is dependent on the volume of the transfer lines (~100 ml for this system). After completing these steps, the entire system must be brought back down to room temperature, with the rate of cooling being the most critical step in the fractionation procedure. The rates for this system are between 1° C. and 2° C./hr. A temperature recorder (15) equipped with a thermocouple (16) in the recirculating oil and a thermocouple (17) in the packed column is used to monitor the temperature changes. During the cooling step the polymer selectively crystallizes allowing for efficient fractionation during the elution step. There is no solvent flow through the column during the cool-down step.

B. Column Elution

Elution of the polymer from the column is started at room temperature with a predetermined temperature rise rate. Solvent flows continuously during this step and fractions are collected over the desired change in temperature (5° C. for this work). The temperature rise rate used here is 6° C./hr. The temperature rise can be achieved in two ways, stepwise or continuous. Solvent flow rates (40 ml/min) are chosen to achieve one interstitial column volume over the desired change in temperature. These rates result in a fraction collection every 50 minutes. Approximately 15 fractions are collected for each sample.

C. Fraction Work-Up

The fractions are mixed about 1:1 with acetone and allowed to sit for at least one day to precipitate the polymer. The polymer-TCB-acetone mixture is then added to a large separatory funnel, and allowed to sit for several minutes until the polymer rises to the top. The bulk of the solvent is then drained and more acetone added to wash the polymer. The acetone-polymer mixture is then vacuum filtered, and the resulting polymer sample dried in a vacuum oven at 80°–90° C. followed by weighing. These samples can then be directly used for gel permeation chromatography, differential scanning calorimetry, and infrared analysis.

D. Branching Content Determination

Branching content (i.e., degree of branching) is calculated from $CH_3/1000\ C$ (methyls/1000 carbons) determination according to ASTM method D2238-68. A Beckman 4260 infrared spectrophotometer is employed, using films of approximately 0.15 mm thickness. A correction for chain end methyl groups is necessary for accurately determining weight percent comonomer (e.g., 1-octene) incorporation. The correction is done according to the following equation:

Corrected $CH_3/1000\ C =$

-continued $$\text{Uncorrected } CH_3/1000 \text{ C} + \frac{\text{Vinyl}}{1000} - \frac{2800}{Mn}$$

Comonomer incorporation can be determined from the following equation:

Wt. % octene =

$$\frac{(\text{Molecular Weight of 1} - \text{octene})(\text{Corrected } CH_3/1000 \text{ C})(100)}{14000 + 84(\text{corrected } CH_3/1000 \text{ C})}$$

E. Molecular Weight Determination

Number average molecular weight (Mn) is measured by using a Waters Model 150C Gel Permeation Chromatograph. The measurements are made by dissolving polymer samples in hot, filtered, 1, 2, 4 trichlorobenzene (TCB). The GPC (Gel Permeation Chromatography) runs are made at 140° C. in TCB. A flow rate of 1.0 ml/min is used and the columns used are 3 Polymer Laboratories 10 micron linear columns. Each column diameter is 7.5 mm and the column length is 30 cm. Column performance is typically around 30,000 plates/meter as determined using 0.02 grams eicosane in 50 milliliters of TCB. Columns are disposed of if the plate count is below 20,000 plates per meter. Column performance is also monitored using the multiplied product of the spreading factor "$\sigma$" and the slope of the calibration curve "D". This value is typically around 0.081. Columns with values above 0.09 for the multiplied factor "$D\sigma$" are not employed. The antioxidant butylated hydroxytoluene is added to the TCB at a concentration of 250 parts per million. The system is calibrated using narrow molecular weight polystyrene standards. The following formula is used to transform polystyrene molecular weights to polyethylene molecular weights:

$$Mw \text{ of polyethylene} = (0.4316)(Mw \text{ of polystyrene})$$

The polyethylene samples are prepared at a concentration of 0.25 grams of polyethylene in 50 milliliters of TCB. The volume injected is 100 microliters.

F. Infrared Determination of Vinyl Content

A Perkin-Elmer Infrared (IR) Model 760 is used to measure vinyl groups in the polymer chains. The polymer is compression molded into a thin film and measured for thickness (target is approximately 0.1–0.3 mm thick). The IR absorbancy spectrum is measured for each film and vinyl group content is calculated according to the following equation:

$$\frac{\text{Vinyl Groups}/1000}{\text{Carbons in the polymer chain}} = \frac{\text{IR Absorbance at } \lambda}{(t)(k)}$$

where: $t$ = thickness $k$ = 0.970 and $\lambda$ = 909 cm$^{-1}$.

The vinyl groups/1000 carbons value obtained is inserted into the equation for determining corrected $CH_3/1000$ carbons for each polymer fraction as described earlier in Section D in this disclosure.

The first linear polyethylene suitable for use as the heat seal layer (A) in the present invention has a degree of branching less than or equal to 2 methyls/1000 carbons in 15% by weight or less, more preferably 10% by weight or less, of the linear polyethylene and a degree of branching equal to or greater than 25 methyls/1000 carbons in 25% by weight or less, more preferably 20% by weight or less, of the first linear polyethylene.

EXAMPLE 1

This example demonstrates heat seal performance of three ULDPE Resins with different short chain branching distributions (SCBD).

ATTANE* 4002 ULDPE (labeled as Resin A), an ethylene/octene-1 copolymer made by The Dow Chemical Company, having $I_2$ = 3.3 grams/10 minutes, $I_{10}/I_2$ = 7.7 and density of about 0.912 g/cc and ATTANE* 4001 ULDPE (labeled as Resin B), also an ethylene/octene-1 copolymer made by The Dow Chemical Company, having $I_2$ = 1.0 gram/10 minute, $I_{10}/I_2$ = 8.2 and density of about 0.912 g/cc and another ULDPE resin (labeled as Resin C), also an ethylene/octene-1 copolymer, having $I_2$ = 3.3 grams/10 minutes, $I_{10}/I_2$ = 7.7 and density of about 0.912 g/cc are made into single layer cast film and evaluated for heat seal performance. Each film sample is heat sealed and then tested for heat seal strength.

Resins A and B have similar short chain branching distributions but differ in $I_2$ and $I_{10}/I_2$. Resin C has a "narrower" short chain branching distribution as compared to Resins A and B, as measured using TREF, since about 8.5% (total weight basis) of Resin C has a degree of branching of less than or equal to 2 methyls/1000 carbons and about 18.5% (total weight basis) of Resin C has a degree of branching of greater than or equal to 25 methyls/1000 carbons. The physical properties of the resins used in all of the experiments described herein (Resins A, B, C and D) are summarized in Table 1.

TABLE 1

| RESIN | $I_2$ (grams/ 10 minutes) | $I_{10}/I_2$ | Density (g/cc) | Weight % polymer fraction having a degree of branching of ≤ 2 methyls/1000 carbons | Weight % polymer fraction having a degree of branching of ≥ 25 methyls/1000 carbons |
|---|---|---|---|---|---|
| A | 3.3 | 7.7 | 0.912 | 16.5 | 27 |
| B | 1.0 | 8.2 | 0.912 | 16.5 | 27 |
| C | 3.3 | 7.7 | 0.912 | 8.5 | 18.5 |
| D | 0.55 | 12 | 0.923 | NM | NM |

NM = Not Measured

Samples of single layer 1 mil thick films are fabricated from Resins A, B and C using a cast film line equipped with a MPM extruder with a 2 inch screw (L/D=24:1) a 12 inch cast film die and a MPM cast film take-up system with a 18 inch chrome plate chill roll and an air knife to cool the polymer melt. The fabrication conditions of the cast film are listed in Table 2.

TABLE 2

| Fabrication Conditions for Samples |  |
|---|---|
| Extruder Zone 1 (°C.) | 200 |

TABLE 2-continued

| Fabrication Conditions for Samples | |
|---|---|
| Extruder Zone 2 (°C.) | 240 |
| Extruder Zone 3 (°C.) | 240 |
| Die Temperature (°C.) | 240 |
| Melt Temp. (°C.) | 240 |
| Chill Roll (°C.) | 12 |
| Extruder (rpm) | 80 |
| Film Gauge (mils) | 1 |
| Extruder Back Pressure (psi) | 1850 |
| Line Speed (feet/minute) | 60 |
| Through put (lbs/hr) | 40 |
| Die Width (inches) | 12 |
| Film Width (inches) | 8 |
| Die Gap (mils) | 8 |

Figure 2:
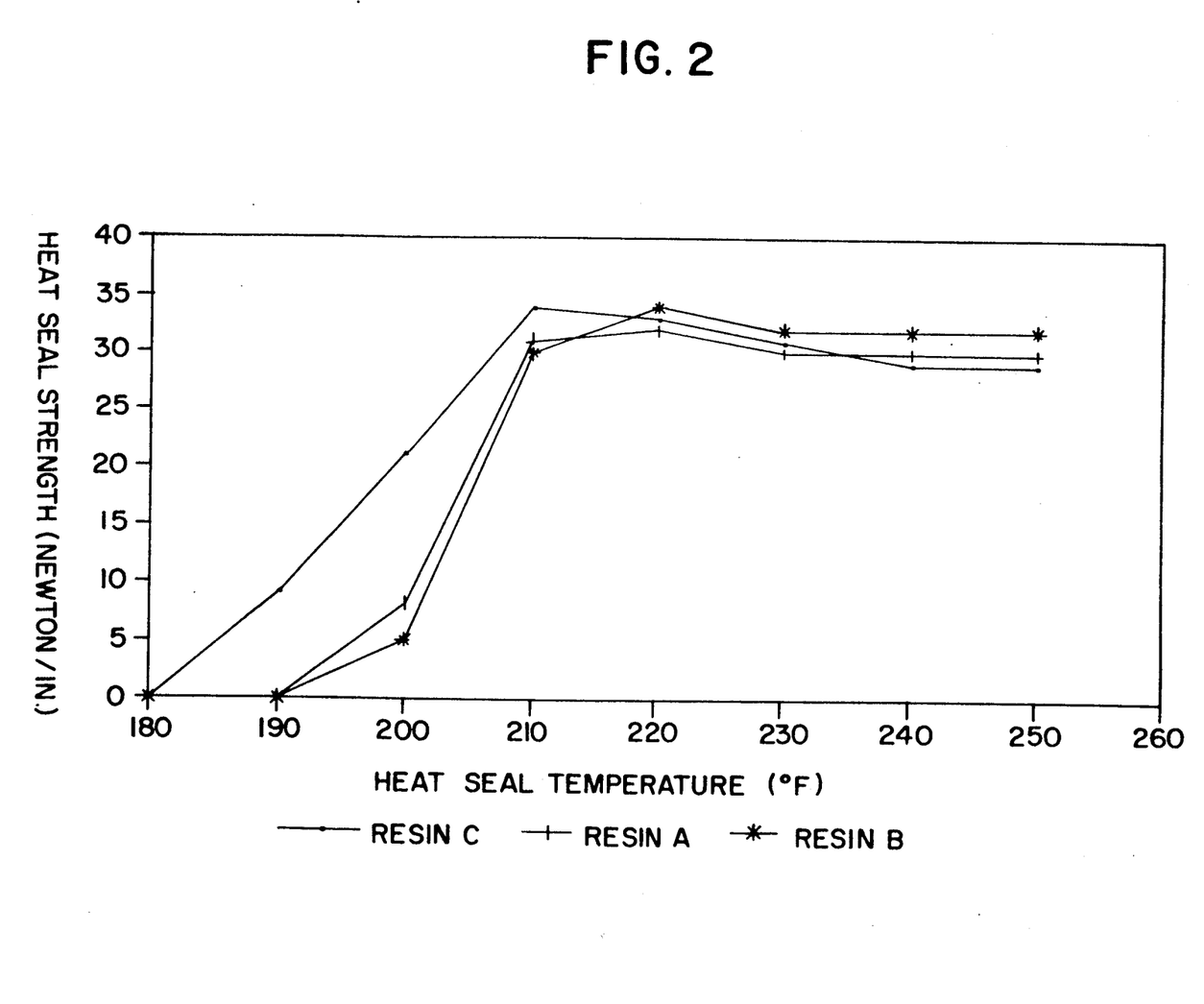
FIG. 2 plots heat seal strength (measured in Newtons/inch) versus heat seal temperature (in °F.) of three ultra low density polyethylene (ULDPE) resins made into film.

The cast film samples are compared for heat seal performance and heat seal strength using an Instron peel test. Film samples for heat seal testing are conditioned as described in ASTM E 171-82 (i.e., 73.4 ±3.6° F., 50±5% relative humidity). The heat seal tests are performed utilizing a heat sealer. A variety of equipment exists for this function, such as a Sentinel Heat Sealer, a Theller Precision Heat Sealer and a Packforsk Hot Tack Tester (made by Top Wave). The conditions for sealing are typically 0.5 second dwell time, 40 psi bar pressure. Both bars are heated. One inch wide by six inch long strips are used for testing. After sealing, the samples are conditioned at the ASTM conditions described above for about 24 hours. The heat seal tests are made using an Instron tensiometer at a constant crosshead speed of about 2 inches/minute in a 90° "T-peel" mode. Three to five heat seal tests are made and tested. The results are averaged and illustrated in FIG. 2 and the data are summarized in Table 3.

Resin C has a "narrower" SCBD and exhibits an improved heat seal performance (i.e., lower heat seal initiation temperature and higher seal strength at below 210° F.) as compared to Resin A and Resin B. Resin C is thus an example of this invention and can be used as a heat seal layer in a multilayer film structure.

TABLE 3

| Heat Seal Strength of Resins A, B, AND C | | | |
|---|---|---|---|
| Heat Seal Temperature (°F.) | Heat Seal Strength (Newtons/inch) | | |
| | Resin A | Resin B | Resin C |
| 180 | 0 | 0 | 0 |
| 190 | 0 | 0 | 9 |
| 200 | 8 | 5 | 21 |
| 210 | 31 | 30 | 34 |
| 220 | 32 | 34 | 33 |
| 230 | 30 | 32 | 31 |
| 240 | 30 | 32 | 29 |
| 250 | 30 | 32 | 29 |

EXAMPLE 2

This example demonstrates heat seal performance of electron beam irradiated ULDPE.

Figure 3:
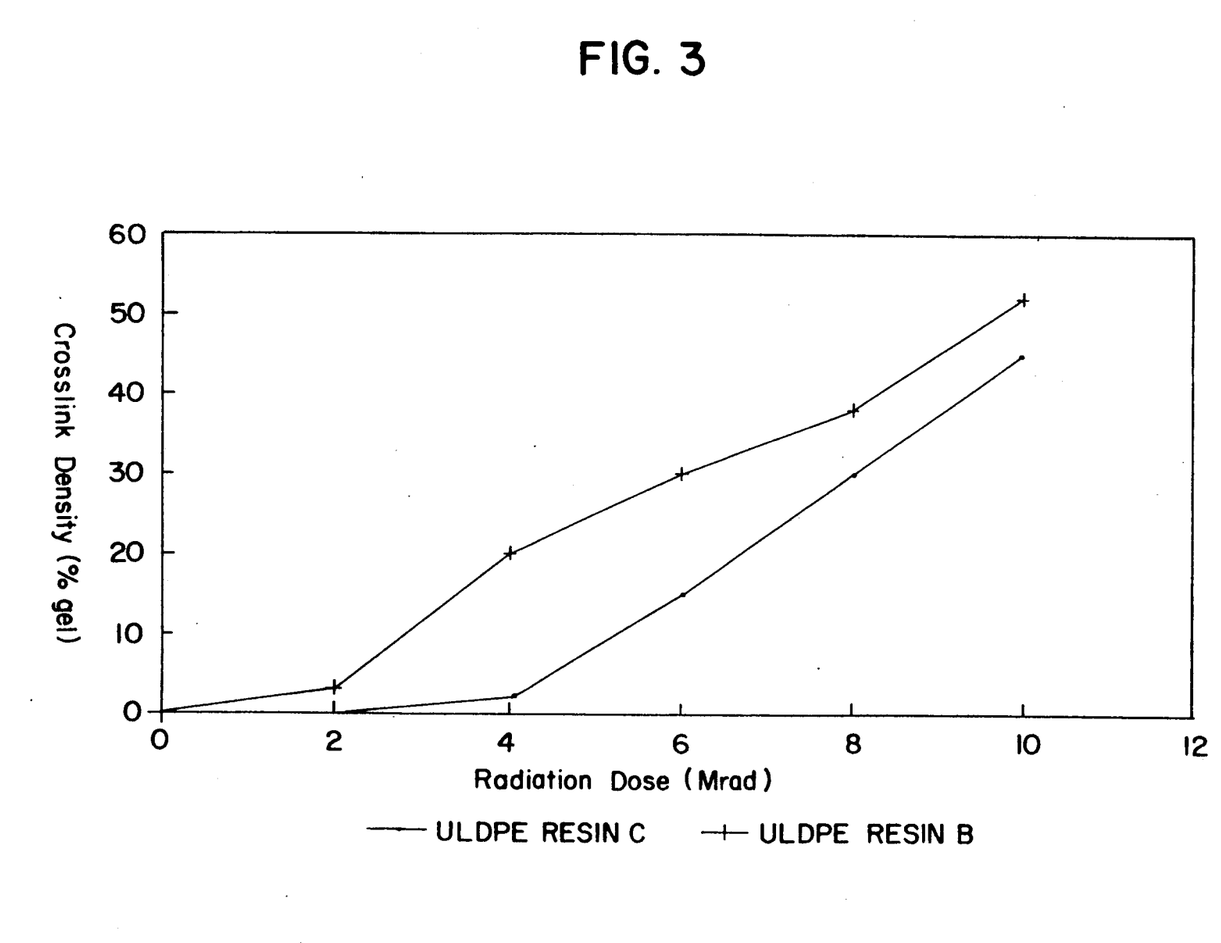
FIG. 3 plots cross-link density (measured in percent gel) versus radiation dosage (in megarads) of two ULDPE resins made into film.

Resin B and Resin C were evaluated for heat seal performance and cross-link density (measured by percent gel) prior to and after electron beam irradiation. An Energy Science Inc. Model EC 200 electron beam radiation machine was used for the radiation treatment. The crosslink density (% gel in xylene, measured by ASTM method D-2765) indicates the resins' propensity for heat seal performance. The cross-link densities of the resins before and after various doses of radiation treatment are illustrated in FIG. 3 and the data are summarized in Table 4. As the data show, resin C can be exposed to about 5 megarads (Mrad) and still maintain a cross-link density of less than about 10% gel and thus is an example of this invention. Resin B reaches a cross-link density of about 10% gel in less than about 3 Mrad exposure and is not an example of this invention for use in the heat seal layer.

TABLE 4

| Crosslink Density of Irradiated ULDPE (Resin B and Resin C) | | |
|---|---|---|
| Radiation Dose (Mrad) | Crosslink Density (% Gel) | |
| | Resin B | Resin C |
| 0 | 0 | 0 |
| 2 | 3 | 0 |
| 4 | 20 | 2 |
| 6 | 30 | 15 |
| 8 | 38 | 30 |
| 10 | 52 | 45 |

Figure 4:
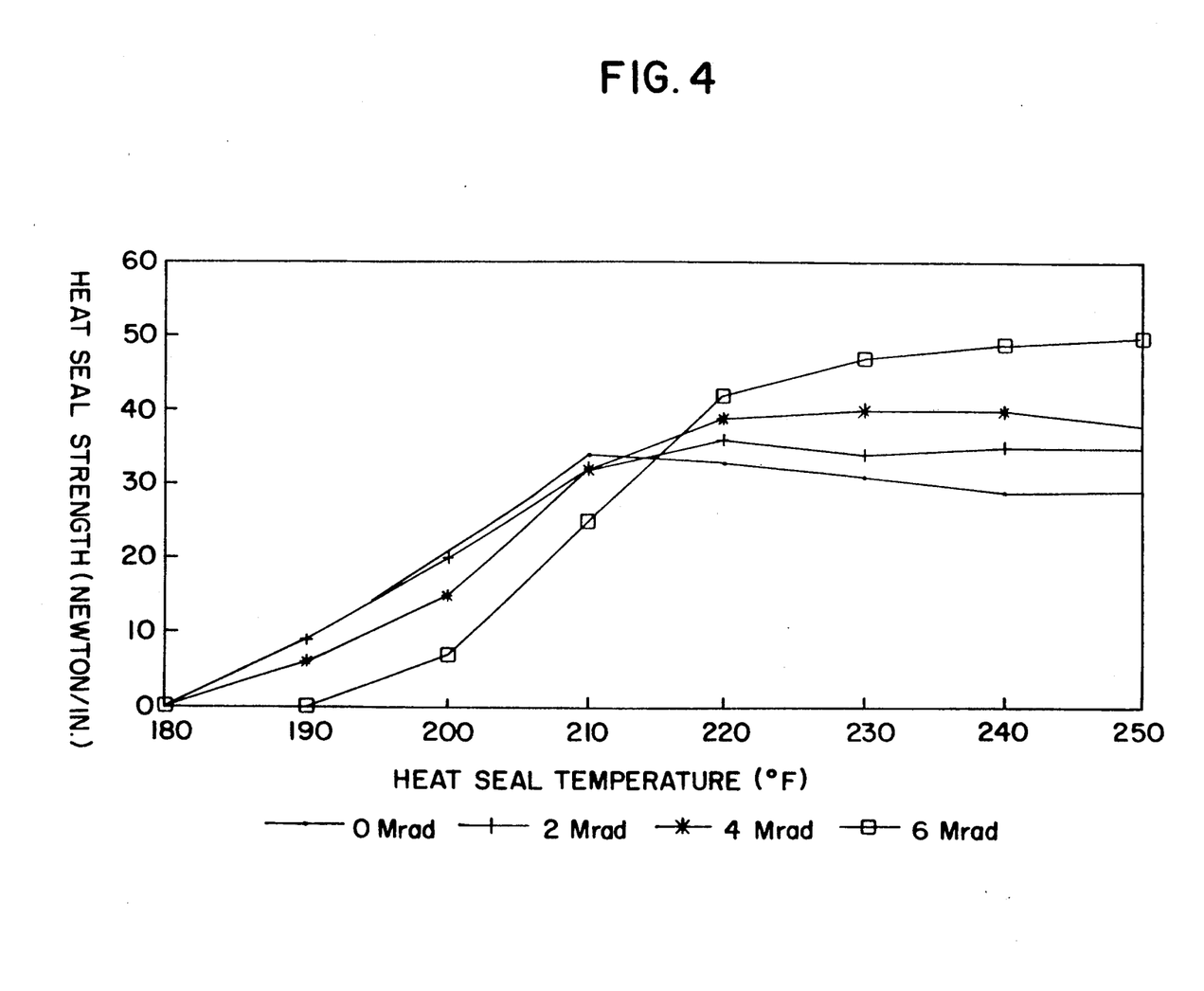
FIG. 4 plots heat seal strength (measured in Newtons/inch) versus heat seal temperature (in °F.) of one ULDPE resin made into film after different levels of exposure to irradiation.
Figure 5:
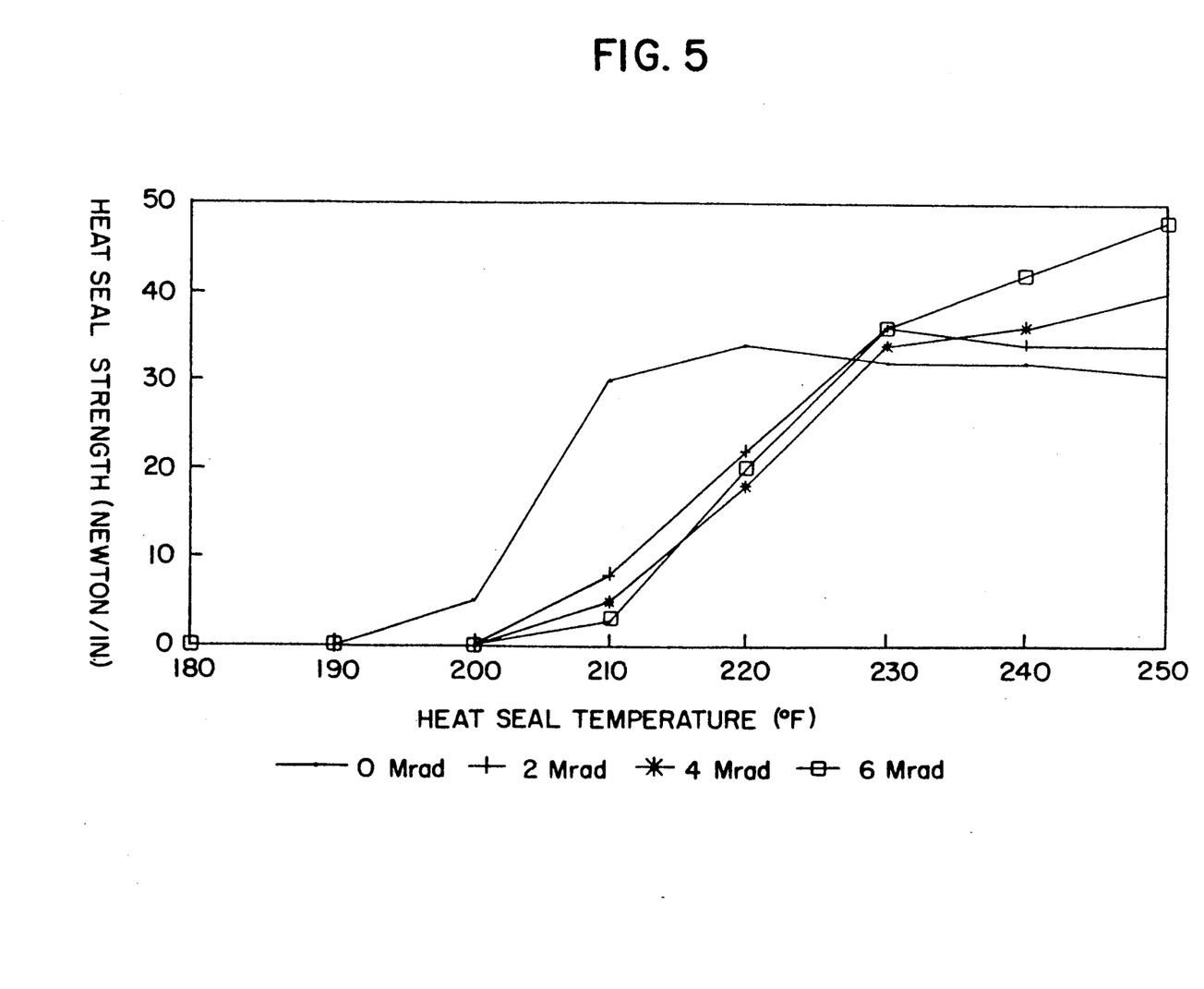
FIG. 5 plots heat seal strength (measured in Newtons/inch) versus heat seal temperature (in °F.) of one ULDPE resin made into film after different levels of exposure to irradiation.

The heat seal performance of Resin B and Resin C prior to and after the radiation treatment was evaluated by the method described in Example 1. The results are illustrated in FIGS. 4 and 5 and the data are summarized in Tables 5 and 6. The data illustrate that Resin C retains good heat seal performance (i.e., a broad temperature bonding window yielding good heat seal values) even after electron beam radiation treatment of up to about 4 Mrad of radiation dosage. As FIG. 4 shows, after an irradiation exposure of about 4 Mrad, Resin C achieves a heat seal strength of about 10 Newtons/inch or more at a heat seal temperature as low as about 195° F. Resin C is thus an example of this invention for use in the heat seal layer of a multilayer structure demonstrating good heat seal at low temperatures after irradiation.

However, for Resin B, heat seal performance deteriorated significantly. After about 4 Mrad irradiation dosage, Resin B achieves a heat seal strength of about 10 Newtons/inch only after heat sealing at a temperature of about 215° F. or more.

TABLE 5

| Heat Seal Strength of Resin C after Irradiation Treatment | | | | |
|---|---|---|---|---|
| Seal Temperature (°F.) | Heat Seal Strength after Irradiation (Newtons/inch) | | | |
| | 0 Mrad | 2 Mrad | 4 Mrad | 6 Mrad |
| 180 | 0 | 0 | 0 | 0 |
| 190 | 9 | 9 | 6 | 0 |
| 200 | 21 | 20 | 15 | 7 |
| 210 | 34 | 32 | 32 | 25 |
| 220 | 33 | 36 | 39 | 42 |
| 230 | 31 | 34 | 40 | 47 |
| 240 | 29 | 35 | 40 | 49 |
| 250 | 29 | 35 | 38 | 50 |

TABLE 6

| Heat Seal Strength of Resin B after Irradiation Treatment | | | | |
|---|---|---|---|---|
| Heat Seal Temperature (°F.) | Heat Seal Strength after Irradiation (Newtons/inch) | | | |
| | 0 Mrad | 2 Mrad | 4 Mrad | 6 Mrad |
| 180 | 0 | 0 | 0 | 0 |
| 190 | 0 | 0 | 0 | 0 |
| 200 | 5 | 0 | 0 | 0 |
| 210 | 30 | 8 | 5 | 3 |
| 220 | 34 | 22 | 18 | 20 |
| 230 | 32 | 36 | 34 | 36 |
| 240 | 32 | 34 | 36 | 42 |
| 250 | 32 | 34 | 40 | 48 |

EXAMPLE 3

This example demonstrates radiation crosslinking performance of LLDPE resins to be used for the core layer of the multi-layer film products with improved heat seal, orientation and shrink performance.

An octene-1 LLDPE copolymer, labeled as Resin D, having $I_2 = 0.55$ grams/10 minutes, $I_{10}/I_2 = 12$ and density of about 0.923 g/cc is fabricated into 1 mil thick film using a blown film process. The blown film is made using a STERLING Blown Film Line. This line has a 3.5 inch diameter extruder, L/D of 30:1, an 8 inch diameter Western Polymer die with a 70 mil die gap, a STERLEX barrier type screw and Internal Bubble Cooling (IBC).

Film samples made from this resin are treated by electron beam radiation using an Energy Science Incorpoated electron beam radiation machine (Model EC200: 200 KeV). The treated polymer film is evaluated for propensity for thermal shrinkage by measuring percent gel (i.e., crosslink density) by the solvent extraction technique as described in Example 2.

Figure 6:
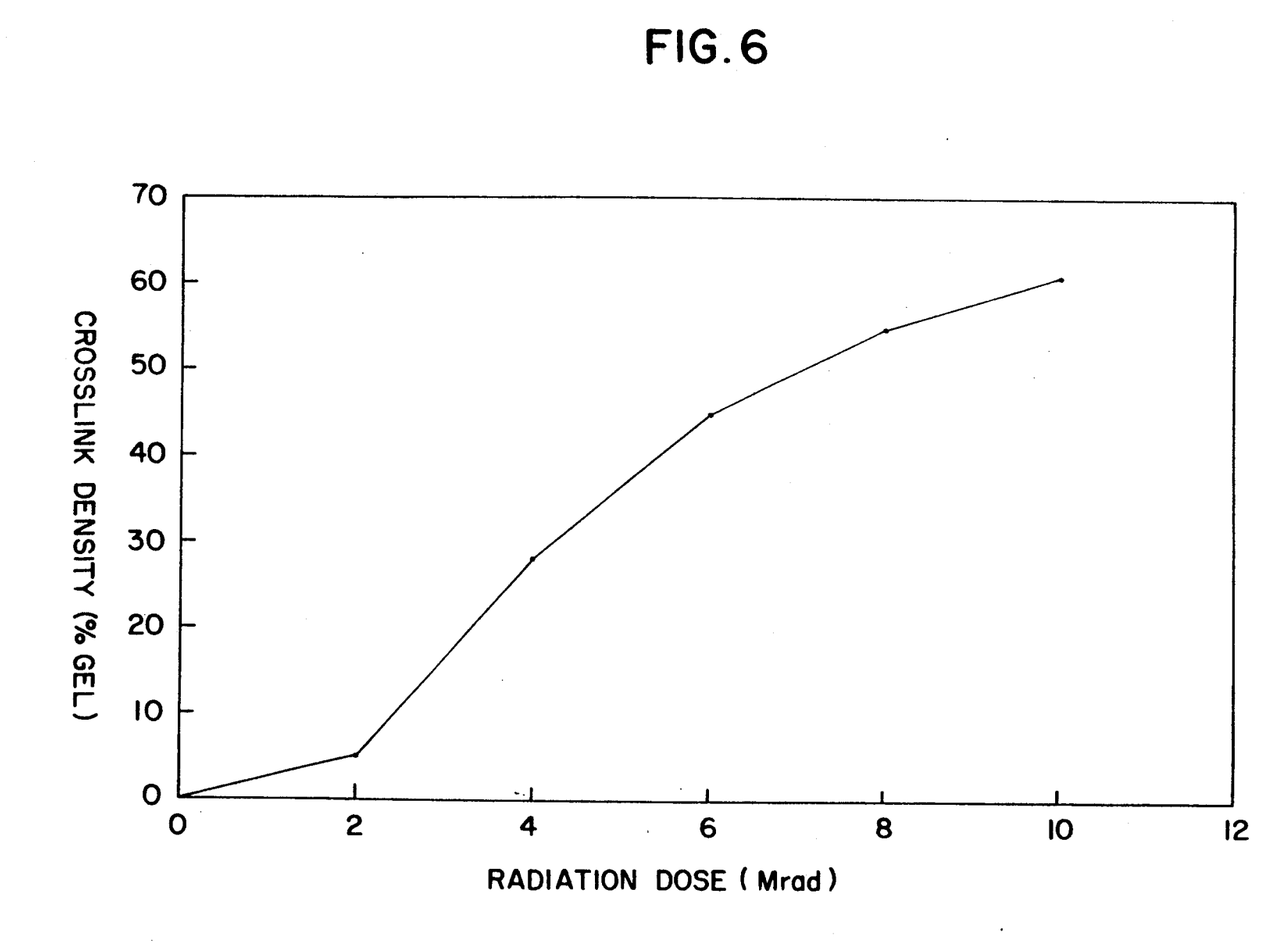
FIG. 6 plots cross-link density (measured in percent gel) versus radiation dosage (in megarads) of one LLDPE resin made into film.

The results are illustrated in FIG. 6 and the data are summarized and compared to Resin C in Table 7. The data show that resin D has an enhanced radiation crosslinking efficiency as compared to Resin C (data shown earlier in Example 2, Table 4). Resin D, having $I_{10}/I_2$ of about 12, has a crosslink density at a dosage of about 3 Mrad of approximately 18 to 20% gel, whereas resin C does not attain a cross-link density of about 20% gel until exposure to about 7 Mrad. Resin D would, therefore, attain higher shrinkage at lower levels of irradiation than resin C, and is thus an example of this invention for use as a core layer in a multilayer structure.

TABLE 7

Crosslink Density of Resins C and D after Irradiation

| Radiation Dose (Mrad) | Crosslink Density (% Gel) | |
|---|---|---|
| | Resin D | Resin C |
| 0 | 0 | 0 |
| 2 | 5 | 0 |
| 4 | 28 | 2 |
| 6 | 45 | 15 |
| 8 | 55 | 30 |
| 10 | 61 | 45 |

EXAMPLE 4

This example demonstrates a two layer co-extruded film product having improved heat seal, crosslinking and orientation/shrink performance after irradiation to 3 Mrad.

A 1 mil thick 2-layer (A/B) co-extruded film sample is fabricated by the following blown film process:

Two layer blown films are prepared in accordance with this invention by fabrication on an Egan coextrusion blown film line equipped with a 2.5 inch diameter main extruder, a 1.5 inch skin layer extruder and a 2 layer single air ring cooled annular die. The multilayer laminated film structure is an A/B configuration in which:

(I) The "A-layer" is the heat seal layer and is extruded through the outer annular die as the outer layer. The "A-layer" extruder is a 1.5 inch (3.81 cm) Egan having an L/D ratio of 20:1. The extruder has four zones temperature control. This extruder is used to feed Resin C to the outer layer. This layer is maintained at a thickness of approximately 0.15 mils (0.0038 mm). The temperature profile of this extruder is as follows:

| | Zone | | | |
|---|---|---|---|---|
| | 1 | 2 | 3 | 4 |
| Temperature (°C.) | 190 | 220 | 230 | 220 |

The polymer melt temperature is about 225° C. The throughput rate is about 18 pounds/hour.

(II) The "B-layer" is the support or core layer and is extruded through the inner annular die as the inside layer. The "B-layer" extruder is a 2.5 inch (6.35 cm) Egan having a screw L/D ratio of 24:1. This extruder is used to feed Resin D to the middle annular die to form the inner layer at a throughput of about 110 pounds/hour and at a melt temperature of about 225° C. The thickness of this layer is approximately 0.85 mils (0.022 mm). The temperature profile of this extruder is as follows:

| | Zone | | | |
|---|---|---|---|---|
| | 1 | 2 | 3 | 4 |
| Temperature (°C.) | 205 | 220 | 230 | 220 |

Resin C described in Example 2 is used to fabricate the heat seal layer and Resin D described in Example 3 is used to fabricate the other layer. The thickness of the heat seal layer is approximately 15% of the total film thickness of about 1 mil. The film sample is irradiated at 3 Mrad using an Energy Science Incorporated electron beam radiation machine (Model EC200). The total crosslink density of the film, measured as percent gel, after the radiation treatment is approximately 16%. At crosslink densities of between about 10% and about 25%, the film is known to have ideal performance for orientation and shrink applications.

The heat seal performance (heat seal layer to heat seal layer) of this co-extruded crosslinked film is evaluated by the method described in Example 1. Table 8 illustrates the heat seal strength of the heat seal layer of film before and after radiation treatment (3 Mrad). The film retains its excellent heat seal performance after the electron beam radiation treatment.

TABLE 8

Heat Seal Strength of the Heat Seal Layer of Coextruded Film Samples before and after Irradiation

| Heat Seal Temperature (°F.) | Heat Seal Strength (Newtons/inch) | |
|---|---|---|
| | 0 Mrad | 3 Mrad |
| 180 | 0 | 0 |
| 190 | 9 | 8 |
| 200 | 20 | 20 |
| 210 | 34 | 36 |
| 220 | 38 | 42 |

This example illustrates that by using the resins disclosed in this invention for specific layers, a multi-layer film can be made, exposed to radiation and still maintain a combination of excellent core layer crosslinking performance and excellent heat seal layer performance.

The invention is particularly useful in heat-seal packaging of food, whereby the packaged food is exposed to irradiation for sterilization purposes. The irradiation simultaneously strengthens the core layer and prepares it for shrinkage upon subsequent exposure to heat. By using the present invention in the heat seal outer layer, the heat seal initiation temperature of the heat seal layer is maintained after irradiation and the heat seal strength of the package is substantially maintained.

What is claimed is:

1. A multilayer heat-sealable thermoplastic film structure having improved heat seal performance after electron beam irradiation, said film structure comprising at least one heat-sealable outer layer (A) and at least one core layer (B), wherein layer (A) comprises a first linear polyethylene having:
   (a) a density from about 0.88 g/cc to about 0.92 g/cc,
   (b) a melt index, measured as $I_2$, from about 2 g/10 minutes to about 20 g/10 minutes,
   (c) a molecular weight distribution, measured as $I_{10}/I_2$, from about 5 to about 8, and wherein
   (d) 15% by weight or less of said first linear polyethylene has a degree of branching less than or equal to 2 methyls/1000 carbons, and
   (e) 25% by weight or less of said first linear polyethylene has a degree of branching equal to or greater than 25 methyls/1000 carbons, and wherein layer (B) comprises a second linear polyethylene having:
   (f) a density from about 0.88 g/cc to about 0.94 g/cc,
   (g) a melt index, measured as $I_2$, from about 0.05 g/10 minutes to about 5 g/10 minutes, and
   (h) a molecular weight distribution, measured as $I_{10}/I_2$, from about 8 to about 30.

2. The film structure of claim 1 wherein the density of the first linear polyethylene is from about 0.89 g/cc to about 0.915 g/cc.

3. The film structure of claim 1 wherein the $I_2$ of the first linear polyethylene is from about 3 g/10 minutes to about 10 g/10 minutes.

4. The film structure of claim 1 wherein the $I_{10}/I_2$ of the first linear polyethylene is from about 6.5 to about 8.

5. The film structure of claim 1 wherein 10% by weight or less of said first linear polyethylene has a degree of branching less than or equal to 2 methyls/1000 carbons, and 20% by weight or less of said first linear polyethylene has a degree of branching equal to or greater than 25 methyls/1000 carbons.

6. The film structure of claim 1 wherein the density of the second linear polyethylene is from about 0.9 g/cc to about 0.93 g/cc.

7. The film structure of claim 1 wherein the $I_2$ of the second linear polyethylene is from about 0.2 g/10 minutes to about 1 g/10 minutes.

8. The film structure of claim 1 wherein the $I_{10}/I_2$ of the second linear polyethylene is from about 8 to about 15.

9. The film structure of claim 1 wherein layer (A) is adjacent to layer (B).

10. A linear polyethylene for use as layer (A) in the film structure of claim 1.

11. The linear polyethylene of claim 10 wherein the linear polyethylene is a copolymer of ethylene and 1-octene.

12. The linear polyethylene of claim 10 wherein the linear polyethylene is a copolymer of ethylene and 1-hexene.

13. A linear polyethylene for use as layer (B) in the film structure of claim 1.

14. The linear polyethylene of claim 13 wherein the linear polyethylene is a copolymer of ethylene and 1-octene.

15. The linear polyethylene of claim 13 wherein the linear polyethylene is a copolymer of ethylene and 1-hexene.

16. The film structure defined by claim 1 which has been electron beam irradiated from about 0.5 Mrad to about 20 Mrad to form an irradiated film structure.

17. The irradiated film structure of claim 16 wherein the heat-sealable outer layer (A) has a cross-link density of less than about 10% gel after about 5 Mrad radiation dosage or less.

18. The irradiated film structure of claim 16 wherein the heat-sealable outer layer (A) has a cross-link density of less than about 10% gel after about 4 Mrad radiation dosage.

19. The irradiated film structure of claim 16 wherein the layer (B) has a cross-link density of at least about 30% gel after about 5 Mrad radiation dosage or less.

20. The irradiated film structure of claim 16 wherein the layer (B) has a cross-link density of at least about 20% gel after about 4 Mrad radiation dosage.

21. The irradiated film structure of claim 16 which has been subsequently heat sealed to form an irradiated and heat sealed film structure.

22. The irradiated and heat sealed film structure of claim 21 wherein said film structure has a heat seal strength of at least about 10 Newtons/inch at a heat seal temperature of at least about 195° F. after electron beam irradiation of about 4 Mrad.

23. The irradiated and heat sealed film structure of claim 22 wherein the heat seal temperature is about 200° F. or less.

* * * * *

UNITED STATES PATENT AND TRADEMARK OFFICE
CERTIFICATE OF CORRECTION

PATENT NO. : 5,089,321
DATED : February 18, 1992
INVENTOR(S) : Chum, et al

It is certified that error appears in the above-indentified patent and that said Letters Patent is hereby corrected as shown below:

On the title page, Item [56], please add —Journal of Applied Polymer Symposium 45, 25-37 (1990), Determination of Short-Chain Branching Distributions of Ethylene Copolymers by Automated Analytical Temperature Rising Elution Fractionation (AUTO-ATREF), by Lonnie G. Hazlitt

*Column 7, line 1, change "+ $\frac{vinyl}{1000} - \frac{2800}{Mn}$" to read --+ $\frac{vinyl}{1000C} - \frac{28000}{Mn}$--.

Signed and Sealed this

Thirty-first Day of August, 1993

Attest:

BRUCE LEHMAN

Attesting Officer

Commissioner of Patents and Trademarks